United States Patent
Wang et al.

(10) Patent No.: US 11,126,821 B2
(45) Date of Patent: Sep. 21, 2021

(54) INFORMATION PROCESSING METHOD, DEVICE, SYSTEM AND STORAGE MEDIUM

(71) Applicant: BAIDU ONLINE NETWORK TECHNOLOGY (BEIJING) CO., LTD., Beijing (CN)

(72) Inventors: Kuipeng Wang, Beijing (CN); Qiang Zhou, Beijing (CN); Haofeng Kou, Sunnyvale, CA (US); Yingze Bao, Sunnyvale, CA (US); Yanwen Fan, Beijing (CN); Peng Fu, Beijing (CN); Yanghua Fang, Beijing (CN); Renyi Zhou, Beijing (CN); Yuexiang Hu, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 133 days.

(21) Appl. No.: 16/458,566

(22) Filed: Jul. 1, 2019

(65) Prior Publication Data
US 2019/0325199 A1   Oct. 24, 2019

(30) Foreign Application Priority Data

Jul. 2, 2018   (CN) .......................... 201810710542.6

(51) Int. Cl.
*G06K 9/00*   (2006.01)
*G06N 3/08*   (2006.01)
(Continued)

(52) U.S. Cl.
CPC ..... *G06K 9/00255* (2013.01); *G06K 9/00369* (2013.01); *G06N 3/08* (2013.01); *G06Q 30/04* (2013.01); *H04L 67/10* (2013.01)

(58) Field of Classification Search
CPC ...................... G06K 9/00255; G06K 9/00369
See application file for complete search history.

(56) References Cited

U.S. PATENT DOCUMENTS

2017/0076195 A1   3/2017   Yang et al.

FOREIGN PATENT DOCUMENTS

JP   2016126749 A   7/2016

OTHER PUBLICATIONS

First Office Action issued in JP Patent Application No. 2019123479 dated Sep. 8, 2020.
(Continued)

*Primary Examiner* — Tuan H Nguyen
(74) *Attorney, Agent, or Firm* — Dilworth IP, LLC

(57) ABSTRACT

An information processing method, a device, a system, and a storage medium. The information processing method includes: an AI camera first obtains real-time data in a unmanned retail scenario and performs a front-end processing on the real-time data based on a neural network model, where the front-end processing includes any one or more of commodity identifying and human body monitoring, and then transmits a result of the front-end processing to a server, where the result of the front-end processing is used to trigger the server to perform face recognition and/or determine a flow direction of a commodity according to the result of the front-end processing. The cost of the entire unmanned retail distributed system and the pressure on data transmission bandwidth can be reduced, and system scalability as well as the performance of the solution to the unmanned retail can be improved effectively.

16 Claims, 4 Drawing Sheets

(51) Int. Cl.
*G06Q 30/04* (2012.01)
*H04L 29/08* (2006.01)

(56) References Cited

OTHER PUBLICATIONS

European Search Report; Application No. 19183853.1; dated Nov. 8, 2019; 4 pages.
Cardarelli et al., "Cooperative cloud robotics architecture for the coordination of multi-AGV systems in industrial warehouses", Mechatronics, Pergamon Press, Oxford, GB, vol. 45, 12 May 12, 2017.
Teerapittayanon et al., "Distributed Deep Neural Networks Over the Cloud, the Edge and End Devices", Proceedings of the International Conference on Distributed Computing Systems, IEEE Computer Society, US, Jun. 5, 2017.
Oral Proceedings in EP Patent Application No. 19183853.1 dated Jun. 14, 2021.

INFORMATION PROCESSING METHOD, DEVICE, SYSTEM AND STORAGE MEDIUM

CROSS-REFERENCE TO RELATED APPLICATIONS

This application claims priority to Chinese Patent Application No. 201810710542.6, filed on Jul. 2, 2018, which is hereby incorporated by reference in its entirety.

FIELD

The present disclosure relates to the Internet technologies, and more particularly, to an information processing method, an information processing device, an information processing system, and a storage medium.

BACKGROUND

With the rapid development of Internet technology, unmanned retail gradually comes into public view. Meanwhile, more high-tech companies are investing manpower and resources in it to study practical and feasible plans.

At present, a conventional single network structure is usually adopted as the solution to unmanned retail. The solution relies on big data and collects data collected by a terminal camera through network transmission to a server for integrated processing.

It is found that the above-mentioned unmanned retail solution has poor perform.

SUMMARY

Embodiments of the present disclosure provide an information processing method, device, system, and storage medium to effectively improve the performance of a solution to unmanned retail.

In a first aspect, an embodiment of the present disclosure provides an information processing method that is applicable to an unmanned retail scenario, which includes:

obtaining, by an artificial intelligence (AI) camera, real-time data in the unmanned retail scenario;

performing, by the AI camera, a front-end processing on the real-time data based on a neural network model, where the front-end processing includes any one or more of commodity identifying and human body monitoring; and transmitting, by the AI camera, a result of the front-end processing to a server, where the result of the front-end processing is used to trigger the server to perform face recognition and/or determine a flow direction of a commodity according to the result of the front-end processing.

In a possible implementation, the neural network model includes a Single Shot MultiBox Detector-MobileNet (SSD-MobileNet) model and a convolutional neural network (CNN) model.

In a possible implementation, the server includes a local server and a cloud server, and the transmitting, by the AI camera, a result of the front-end processing to a server includes:

transmitting, by the AI camera, the result of the front-end processing to the local server, where the result of the front-end processing is used to trigger the local server to perform an edge processing according to the result of the front-end processing, and transmit a result of the edge processing to the cloud server, where the result of the edge processing is used to trigger the cloud server to perform the face recognition and/or determine the flow direction of the commodity according to the result of the edge processing, where the edge processing includes a visual processing of a human body.

In a possible implementation, the result of the edge processing is further used to trigger the cloud server to generate a bill according to the result of the edge processing and transmit the bill to a user equipment.

In a possible implementation, the AI camera includes a camera and an AI chip connected to the camera; where:

the camera is configured to capture the real-time data in the unmanned retail scenario and transmit the real-time data to the AI chip; and the AI chip is configured to perform the front-end processing on the real-time data based on the neural network model, and transmit the result of the front-end processing to the server.

In a second aspect, an embodiment of the present disclosure provides an information processing method, which is applicable to an unmanned retail scenario, including:

receiving, by a server, a result of a front-end processing, where the result of the front-end processing is a result of the front-end processing performed by an artificial intelligence (AI) camera on real-time data in the unmanned retail scenario based on a neural network model, where the front-end processing includes any one or more of commodity identifying and human body monitoring; and performing face recognition and/or determining a flow direction of a commodity according to the result of the front-end processing.

In a possible implementation, the neural network model includes an SSD-MobileNet model and a convolutional neural network (CNN) model.

In a possible implementation, the server includes a local server; and the performing face recognition and/or determining a flow direction of a commodity according to the result of the front-end processing includes:

performing, by the local server, an edge processing according to the result of the front-end processing, where the edge processing includes a visual processing of a human body; and transmitting a result of the edge processing to a cloud server, where the result of the edge processing is used to trigger the cloud server to perform the face recognition and/or determine the flow direction of the commodity according to the result of the edge processing.

In a possible implementation, the server includes a cloud server, and the performing face recognition and/or determining a flow direction of a commodity according to the result of the front-end processing, includes:

receiving, by the cloud server, a result of an edge processing, where the result of the edge processing is a result of the edge processing performed by a local server according to the result of the front-end processing, where the edge processing includes a visual processing of a human body; and performing the face recognition or determining the flow direction of the commodity according to the result of the edge processing.

In a possible implementation, after receiving, by the cloud server, a result of an edge processing, further includes:

generating a bill according to the result of the edge processing; and transmitting the bill to a user equipment.

In a third aspect, an embodiment of the present disclosure provides an artificial intelligence (AI) camera, which is applicable to an unmanned retail scenario, including:

an obtaining module, configured to obtain real-time data in the unmanned retail scenario;

a processing module, configured to perform a front-end processing on the real-time data obtained by the obtaining module based on a neural network model, where the front-end processing includes any one or more of commodity identifying and human body monitoring; and a transmitting module, configured to transmit a result of the front-end processing obtained by the processing module to a server, where the result of the front-end processing is used to trigger the server to perform face recognition and/or determine a flow direction of a commodity according to the result of the front-end processing.

In a possible implementation, the neural network model includes an SSD-MobileNet model and a convolutional neural network (CNN) model.

In a possible implementation, the server includes a local server and a cloud server, and the transmitting module is specifically configured to: transmit the result of the front-end processing to the server, where the result of the front-end processing is used to trigger the local server to perform an edge processing according to the result of the front-end processing, and transmit a result of the edge processing to the cloud server, where the result of the edge processing is used to trigger the cloud server to perform the face recognition and/or determine the flow direction of the commodity according to the result of the edge processing, where the edge processing includes a visual processing of a human body.

In a possible implementation, the result of the edge processing is further used to trigger the cloud server to generate a bill according to the result of the edge processing and transmit the bill to a user equipment.

In a fourth aspect, an embodiment of the present disclosure provides a server, which is applicable to a unmanned retail scenario, including:

a first receiving module, configured to receive a result of a front-end processing, where the result of the front-end processing is a result of the front-end processing performed by an artificial intelligence (AI) camera on real-time data in the unmanned retail scenario based on a neural network model, where the front-end processing includes any one or more of commodity identifying and human body monitoring; and a processing module, configured to perform face recognition and/or determine a flow direction of a commodity according to the result of the front-end processing received by the first receiving module.

In a possible implementation, the server includes a local server, and the processing module includes a first processing module; where:

the local server includes the first receiving module, the first processing module and a first transmitting module;

the first processing module is used to perform an edge processing according to the result of the front-end processing received by the first receiving module, where the edge processing includes a visual processing of a human body;

the first receiving module is used to transmit a result of the edge processing obtained by the first processing module to a cloud server, where the result of the edge processing is used to trigger the cloud server to perform the face recognition and/or determine the flow direction of the commodity according to the result of the edge processing.

In a possible implementation, the server includes a cloud server, and the processing module includes a second processing module; where:

the cloud server includes a second receiving module and the second processing module;

the second receiving module is used to receive a result of an edge processing, where the result of the edge processing is a result of the edge processing performed by a local server according to the result of the front-end processing, where the edge processing includes a visual processing of a human body; and the second processing module is used to perform the face recognition or determine the flow direction of the commodity according to the result of the edge processing.

In a possible implementation, the cloud sever further include a second transmitting module, where the second processing module is further configured to generate a bill according to the result of the edge processing; and the second transmitting module is configured to transmit the bill to a user equipment.

In a possible implementation, the neural network model includes an SSD-MobileNet model and a convolutional neural network (CNN) model.

In a fifth aspect, an embodiment of the present disclosure provides an electronic device, including: a processor and a memory;

the memory is configured to store computer executable instructions;

the processor is configured to execute the computer executable instructions, so that the processor performs the information processing method according to any one of the first aspect and/or the information processing method according to any one of the second aspect.

In a sixth aspect, an embodiment of the present disclosure provides a computer readable storage medium, storing a computer execution instruction which, when executed by a processor to implement the following:

the information processing method according to any one of the first aspect; and/or the information processing method according to any one of the second aspect.

In a seventh aspect, an embodiment of the present disclosure provides an information processing system, which is applicable to an unmanned retail scenario, including:

the artificial intelligence (AI) camera according to the third aspect, and a server according to the fourth aspect.

In a possible implementation, the server includes a local server and a cloud server, where the local server is configured to perform an operation performed by the local server in the information processing method according to the second aspect; and the cloud server is configured to perform an operation performed by the cloud server in the information processing method according to the second aspect.

Embodiments of the present disclosure provide an information processing method, a device, a system, and a storage medium. The information processing method includes: the AI camera obtains real-time data in a unmanned retail scenario, and performs a front-end processing on the real-time data based on a neural network model, where the front-end processing includes any one or more of commodity identifying and human body monitoring, and then transmits a result of the front-end processing to a server, where the result of the front-end processing is used to trigger the server to perform face recognition and/or determine a flow direction of a commodity according to the result of the front-end processing. Embodiments of the present disclosure consider the timeliness and convenience of obtaining real-time data on an end, introduces the AI camera as a base operator of the front-end, and a back-end processing from the server to introduce an idea of distributed computation in the unmanned retail scenario, which can reduce the cost of the entire unmanned retail distributed system, reduce the pressure on data transmission bandwidth, and effectively improving system scalability as well as the performance of the solution to the unmanned retail.

BRIEF DESCRIPTION OF DRAWINGS

In order to illustrate the technical solutions of embodiments of the present disclosure, or the technical solutions of the prior art, the drawings used in the embodiments of the present disclosure or the prior art will be briefly described below. It is apparent that the drawings in the following description are merely some embodiments of the present disclosure; other drawings may be obtained by those of ordinary skill in the art without any creative efforts.

DETAILED DESCRIPTION

The technical solutions of embodiments of the present disclosure will be clearly and comprehensively described in the following with reference to the accompanying drawings to make the objects, technical schemes and advantages of the embodiments of the present disclosure clearer. It is apparent that the described embodiments are merely a part of, rather than all of, the embodiments of the present disclosure. All other embodiments obtained by those of ordinary skill in the art based on the embodiments of the present disclosure without creative efforts shall fall within the scope of the present disclosure.

Figure 1:
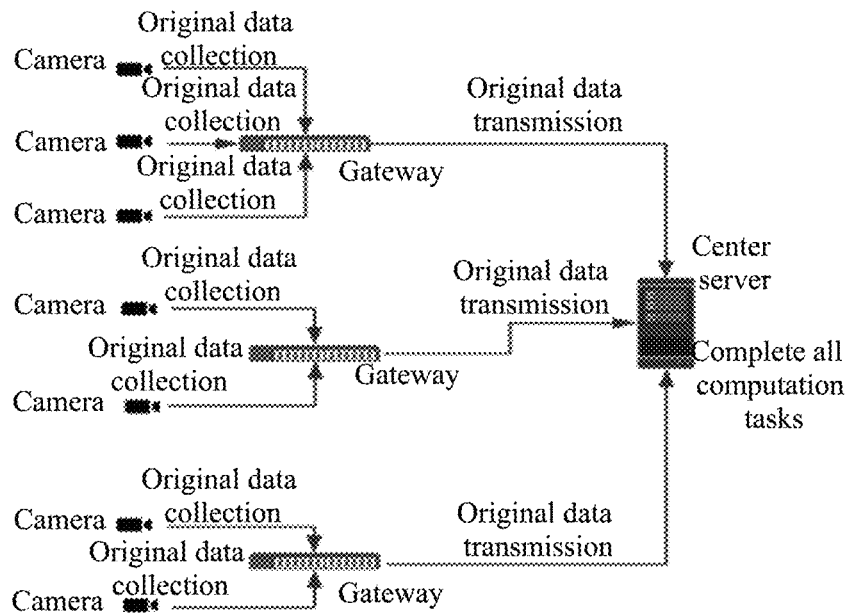
FIG. 1 shows a schematic structural diagram of a conventional single network structure.

FIG. 1 shows a schematic structural diagram of a conventional single network structure. Referring to FIG. 1, a massive number of cameras are deployed at a terminal to collect original data, which is then transmitted to a cloud server via a gateway through a network, and eventually the cloud server performs all the computing tasks. There is no doubt that in the related technology only the cloud server plays a role in computing. Thus, how to free the cloud server from high load and heavy computing tasks has become a topic being explored continuously in the industry.

Considering the above problem, an embodiment of the present disclosure provides an information processing method, an information processing device, an information processing system, and a storage medium. By introducing an AI camera as a base operator of a front-end, and combining back-end processing from the server to introduce an idea of distributed computation, which can lower the computational burden of the cloud server, reduce the cost of the entire unmanned retail distributed system, reduce throughput, the pressure on data transmission bandwidth as well as delay, and effectively improving system scalability.

Figure 2:
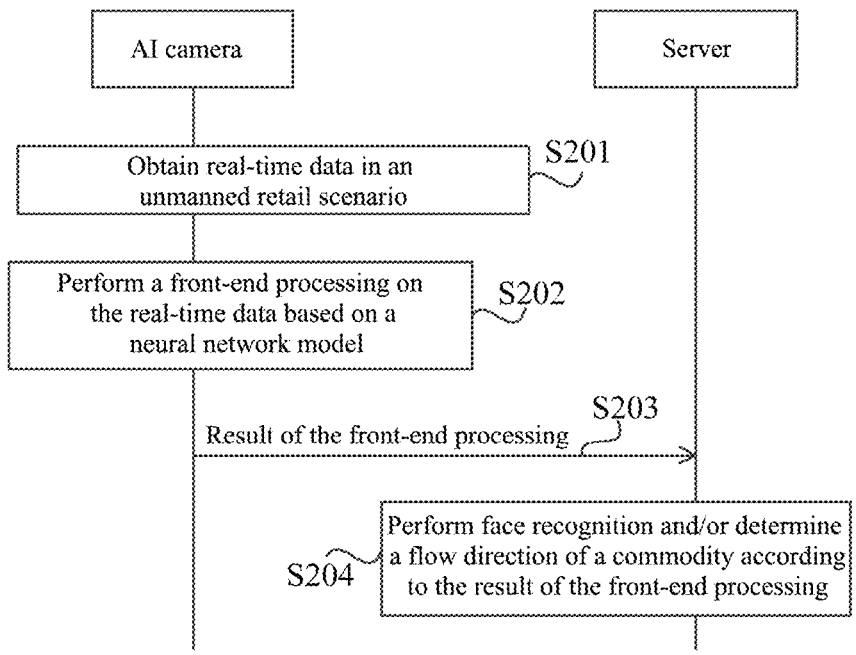
FIG. 2 is a flowchart of an information processing method according to an embodiment of the present disclosure.

FIG. 2 is a flowchart of an information processing method according to an embodiment of the present disclosure. The embodiment of the invention provides an information processing method, which is applicable to an unmanned retail scenario. The information processing method can be implemented by software and/or hardware.

As shown in FIG. 2, the information processing method includes:

S201: The Artificial Intelligence AI camera obtains real-time data in an unmanned retail scenario.

In practical applications, at least one AI camera is arranged in the unmanned retail scenario to obtain real-time data at various angles. The real-time data may include, but is not limited to, data related to a commodity, data related to a user in the unmanned retail scenario, and the like.

Optionally, the AI camera includes a camera, and specifically, the real-time data in the unmanned retail scenario may be obtained through the camera. Specifically, the camera may be a monocular camera, a binocular camera, or a trinocular camera.

S202: The AI camera performs a front-end processing on the real-time data based on a neural network model.

The front-end processing includes any one or more of commodity identifying, human body monitoring, and the like. In the unmanned retail scenario, a key algorithm mainly includes two parts: commodity identifying, and human body monitoring and tracking, where the human body monitoring and tracking may include human body monitoring and human body tracking. Here, the commodity identifying and human body monitoring are performed by the AI camera, while the human body tracking is performed by the server.

In the conventional solution to unmanned retail, the calculation of both the commodity identifying and the human body monitoring and tracking are performed on a cloud server, resulting in a large burden on the cloud server. The embodiment of the present disclosure considers the timeliness and convenience of obtaining real-time data on an end, and introduces an AI camera as a base operator of the front-end to perform a basic deep learning calculation, that is, the AI camera performs the front-end processing on the real-time data.

S203: The AI camera transmits the result of the front-end processing to the server.

It can be understood that the amount of data of the result of the front-end processing is less than that of the real-time data. As a result, throughput, the pressure on data transmission bandwidth as well as delay can be reduced, thereby effectively improving system scalability.

Correspondingly, the server receives the result of the front-end processing transmitted by the AI camera.

S204: The server performs face recognition and/or determines a flow direction of a commodity according to the result of the front-end processing.

By way of example, the result of the front-end processing may include an image of the commodity, and the server may determine the flow direction of the commodity based on the background of the image of the commodity; alternatively, the result of the front-end processing may include an image of a human body, and the server may perform the face recognition based on the image of the human body; alternatively, the server determines who takes the commodity based on the result of the front-end processing, and so on.

As a result, the result of the front-end processing may be used to trigger the server to execute S204.

In the embodiment of the present disclosure, the AI camera obtains real-time data in a unmanned retail scenario, and performs a front-end processing on the real-time data based on a neural network model, where the front-end processing includes any one or more of commodity identifying and human body monitoring, and then transmits a result of the front-end processing to a server, where the result of the front-end processing is used to trigger the server to perform face recognition and/or determine a flow direction of a commodity according to the result of the front-end processing. The embodiment of the present disclosure considers the timeliness and convenience of obtaining real-time data on an end, introduces the AI camera as a base operator of the front-end to perform a deep learning and computation, and a back-end processing from the server to introduce an idea of distributed computation in the unmanned retail scenario, which can reduce the cost of the entire unmanned retail distributed system, reduce the pressure on data transmission bandwidth, and effectively improving system scalability as well as the performance of the solution to the unmanned retail.

Based on the foregoing embodiment, optionally, the neural network model may include an SSD-MobileNet model and a convolutional neural network (CNN) model. It can be understood that the neural network model is pre-trained according to training data, where the specific training process can refer to related technologies, and details are not described herein. It should be noted that when the AI camera performs commodity identifying on real-time data based on the neural network model, the training data includes a feature such as an image of the commodity; when the AI camera performs human body monitoring on real-time data based on the neural network model, the training data includes a feature related to human monitoring.

Further, the server may include a local server and a cloud server. That is to say, the steps performed by the server in the above embodiment may be performed by the local server or by the cloud server, or may be performed by both the local server and the cloud server.

In some embodiments, the AI camera may also include an AI chip connected to the camera. The camera is configured to capture real-time data in an unmanned retail scenario and transmit it to the AI chip; while the AI chip is configured to perform a front-end processing on the real-time data based on a neural network model, and transmit the result of the front-end processing to a server.

Based on considerations regarding system performance, the AI camera in some embodiments may be utilize an AI chip that integrates 12 128-Bit SHAVE Vector processors for machine vision, as well as numerous hardware accelerators, image/visual signal processors, and also integrates two 32 Bit RISC processor, a series of configurable peripherals such as interfaces like 12 Lanes MIPI, I2C, SPI, I2S, PWM, USB3.0, SDIO, and Ethernet. The AI chip ensures that corresponding neural network computing tasks can be done well even with low power consumption.

By using a low cost AI chip, the above embodiment greatly reduces the cost of the entire system.

Next, an example will be described in which the steps performed by the server in above embodiment are performed jointly by a local server and a cloud server.

Figure 3:
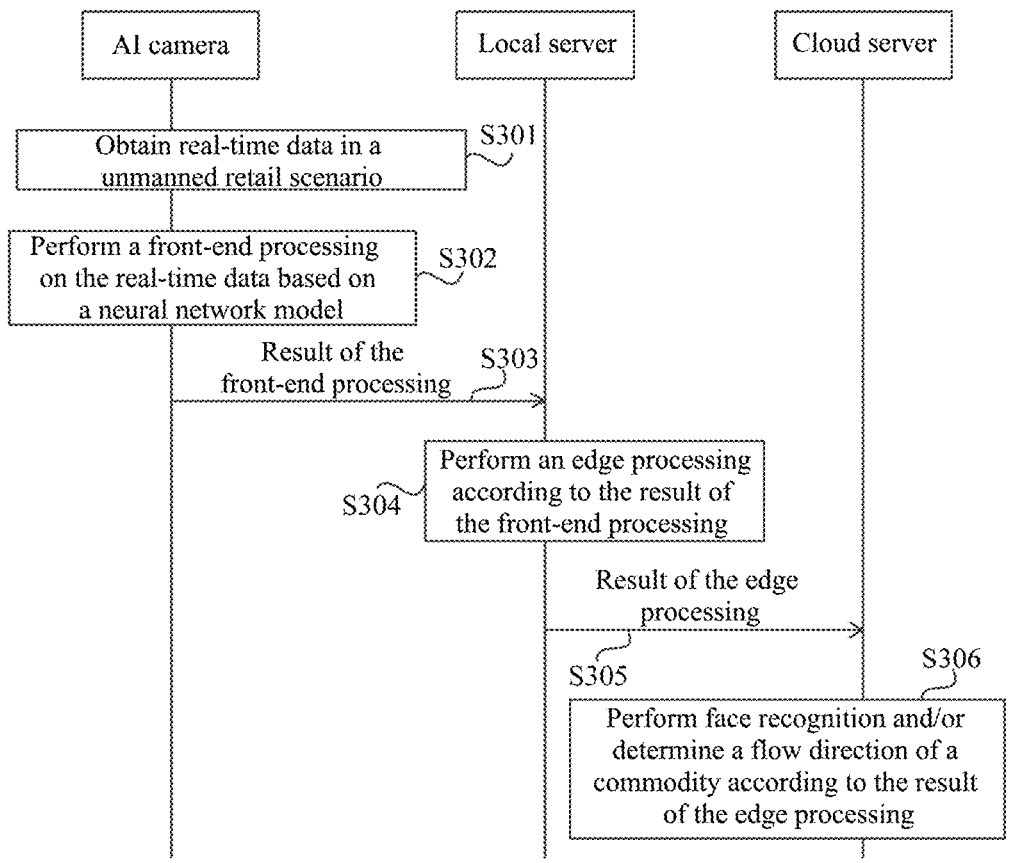
FIG. 3 is a flowchart of an information processing method according to another embodiment of the present disclosure.

FIG. 3 is a flowchart of an information processing method according to another embodiment of the present disclosure. As shown in FIG. 3, the information processing method in this embodiment may include:

S301: The AI camera obtains real-time data in an unmanned retail scenario.

This step is the same as S201, and will not be repeated herein.

S302: The AI camera performs a front-end processing on the real-time data based on a neural network model.

This step is the same as S202, and will not be repeated herein.

S303. The AI camera transmits a result of the front-end processing to the local server.

This step is similar to S203 and will not be described herein.

Correspondingly, the local server receives the result of the front-end processing.

S304. The local server performs an edge processing according to the result of the front-end processing.

The edge processing may include an edge calculation such as visual processing of a human body. For example, the local server may determine the difference among images at various different angles according to the result of the front-end processing transmitted by the AI camera, and the like.

Illustratively, the local server may use TX1/TX2, or TX1/TX2 combined with a low-end graphics processing unit (GPU) to perform the edge processing. AI ternatively, the local server may be configured with an Advanced RISC Machines (ARM) system for an edge calculation with a more complicated structure, or a CV operation that is not suitable for calculation on the end (i.e., an AI camera).

As a result, the result of the front-end processing may be used to trigger the local server to perform S304.

S305: The local server transmits a result of the edge processing to the cloud server.

Correspondingly, the cloud server receives the result of the edge processing.

S306: The cloud server performs face recognition and/or determines a flow direction of a commodity according to the result of the edge processing.

As a result, the result of the edge processing may be used to trigger the cloud server to perform S306.

The cloud server is mainly responsible for some complex calculations, such as calculating human body trace and realizing human body tracking.

This step is similar to S204.

The embodiment of the present disclosure introduces an idea of distributed computation, which can improve the robustness of the system, and achieve the purpose of reducing the cost by deploying a large number of cameras on the end. In an unmanned retail scenario, the core of the solution is designed around computing tasks. From the perspective of computing tasks, the entire unmanned retail distributed system is divided into the following three parts:

(1) A front-end processing part, which is implemented by an AI camera.

(2) An edge processing part, which is implemented by the local server.

(3) A complex computing part, which is implemented by the cloud server.

The idea of distributed computing achieves a better modularization, which is beneficial to the system scalability and improves the efficiency of collaborating.

In the above embodiment, the funnel-like data filtering and cleaning are used to achieve data splitting, so as to reduce the calculation pressure and the bandwidth pressure on the next layer. In particular, due to the unreliability of network communications, the continuous high-load network environment is a huge challenge to the stability and practicability of the system. For the purpose of reducing the amount of communication data and lowering the payload of the network, the present disclosure designs a funnel-like data transmission method, filters data selectively to achieve data splitting, so as to reduce the calculation pressure on the next layer. Compared with the conventional solution to the single network structure of the unmanned retail that all data has to be transmitted to the cloud server indistinguishably, the present disclosure moves part of the calculation and introduces a front-end processing and an edge processing, transmits only the result of the computation to the cloud server, which greatly reduces data transmission and lowers the payload, mitigates the calculation pressure on the cloud server and reduces the cost.

It has been verified that the performance of the unmanned retail distributed system provided by the embodiment of the present disclosure is far superior to the existing single network solution.

Optionally, after the result of the edge processing is received by the cloud server, the method may further include: generating a bill according to the result of the edge processing, and transmitting the bill to a user equipment, thereby completing a retail process. In this implementation, the result of the edge processing may also be used to trigger the cloud server to generate a bill according to the result of the edge processing, and transmit the bill to the user equipment.

Figure 4:
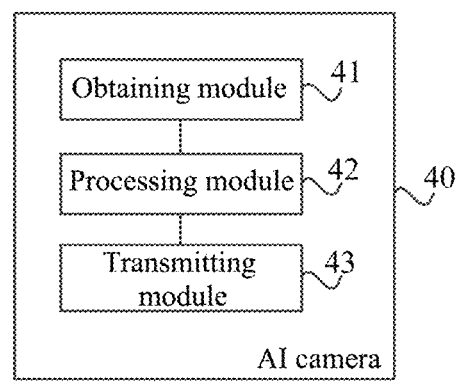
FIG. 4 is a schematic structural diagram of an AI camera according to an embodiment of the present disclosure.

FIG. 4 is a schematic structural diagram of an AI camera according to an embodiment of the present disclosure. Embodiments of the present disclosure provide an AI camera that is applicable to an unmanned retail scenario. The AI camera may be implemented by software and/or hardware.

As shown in FIG. 4, the AI camera 40 includes an obtaining module 41, a processing module 42, and a transmitting module 43.

The obtaining module 41 is configured to obtain real-time data in an unmanned retail scenario.

The processing module 42 is configured to perform a front-end processing on the real-time data obtained by the obtaining module 41 based on a neural network model, where the front-end processing includes any one or more of commodity identifying and human body monitoring.

The transmitting module 43 is configured to transmit a result of the front-end processing obtained by the processing module 42 to a server, where the result of the front-end processing is used to trigger the server to perform face recognition and/or determine a flow direction of a commodity according to the result of the front-end processing.

The AI camera provided in this embodiment can be used to perform the steps performed by the AI camera in the foregoing method embodiment, and the implementation manner and the technical effect are similar, which are not repeated herein.

In the above embodiments, the neural network model may include, but is not limited to, an SSD-MobileNet model, a CNN model, and the like.

In some embodiments, the server may include a local server and a cloud server. At this time, the transmitting module 43 may be specifically configured to transmit the result of the front-end processing to the local server, where the result of the front-end processing is used to trigger the local server to perform the edge processing according to the result of the front-end processing, and transmit the result of the edge processing to the cloud server. The result of the edge processing may be used to trigger the cloud server to perform face recognition and/or determine a flow direction of a commodity according to the result of the edge processing. The edge processing may include a visual processing of a human body and the like.

Further, the result of the edge processing may also be used to trigger the cloud server to generate a bill according to the result of the edge processing, and transmit the bill to a user equipment.

Figure 5:
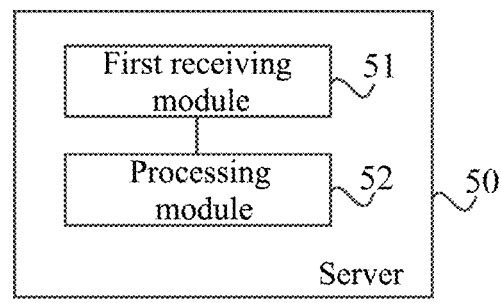
FIG. 5 is a schematic structural diagram of a server according to an embodiment of the present disclosure.

FIG. 5 is a schematic structural diagram of a server according to an embodiment of the present disclosure. Embodiments of the present disclosure provide a server applicable to an unmanned retail scenario. The server may be implemented by software and/or hardware. Referring to FIG. 5, a server 50 includes a first receiving module 51 and a processing module 52.

The first receiving module 51 is configured to receive a result of a front-end processing. The result of the front-end processing is a result of the front-end processing performed by an artificial intelligence (AI) camera on real-time data in the unmanned retail scenario based on a neural network model, where the front-end processing includes any one or more of commodity identifying and human body monitoring.

The processing module 52 is configured to perform face recognition and/or determine a flow direction of a commodity according to the result of the front-end processing received by the first receiving module 51.

The server provided in this embodiment may be used to perform the steps performed by the server in the foregoing method embodiment, and the implementation manners and the technical effects are similar, which are not repeated herein.

Based on the above embodiments, in one implementation, the server 50 may include a local server. At this point, the processing module 52 may include a first processing module.

Figure 6:
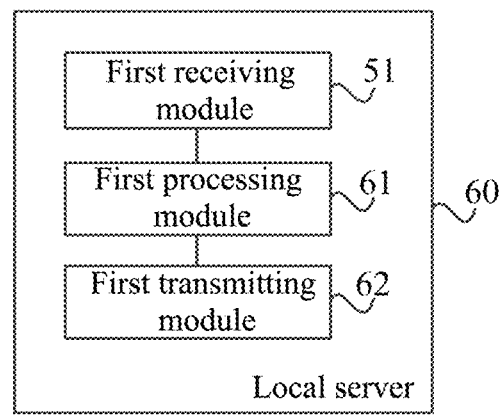
FIG. 6 is a schematic structural diagram of a local server according to an embodiment of the present disclosure.

FIG. 6 is a schematic structural diagram of a local server according to an embodiment of the present disclosure. As shown in FIG. 6, the local server 60 includes a first receiving module 51, a first processing module 61, and a first transmitting module 62.

The first processing module 61 is configured to perform an edge processing according to the result of the front-end processing received by the first receiving module 51, where the edge processing includes a visual processing of a human body.

The first transmitting module 62 is configured to transmit a result of the edge processing obtained by the first processing module 61 to a cloud server, where the result of the edge processing is used to trigger the cloud server to perform the face recognition and/or determine the flow direction of the commodity according to the result of the edge processing.

In another implementation, the server 50 may include a cloud server. At this point, the processing module 52 may include a second processing module.

Figure 7:
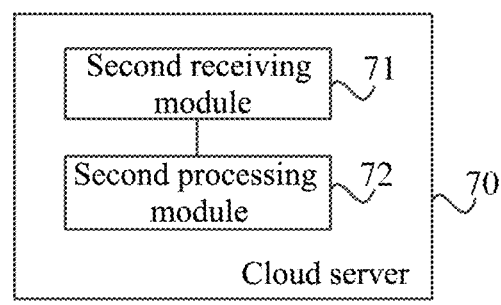
FIG. 7 is a schematic structural diagram of a cloud server according to an embodiment of the present disclosure.

FIG. 7 is a schematic structural diagram of a cloud server according to an embodiment of the present disclosure. As shown in FIG. 7, the cloud server 70 includes a second receiving module 71 and a second processing module 72.

The second receiving module 71 is configured to receive a result of an edge processing, where the result of the edge processing is a result of the edge processing performed by a local server according to the result of the front-end processing, where the edge processing includes a visual processing of a human body.

The second processing module 72 is configured to perform the face recognition or determine the flow direction of the commodity according to the result of the edge processing.

Further, the cloud server 70 may further include a second transmitting module (not shown). At this time, the second processing module 72 may be further configured to generate a bill according to the result of the edge processing. The second transmitting module is configured to transmit the bill to a user equipment.

Optionally, the above neural network model may include an SSD-MobileNet model, a CNN model, and the like.

Figure 8:
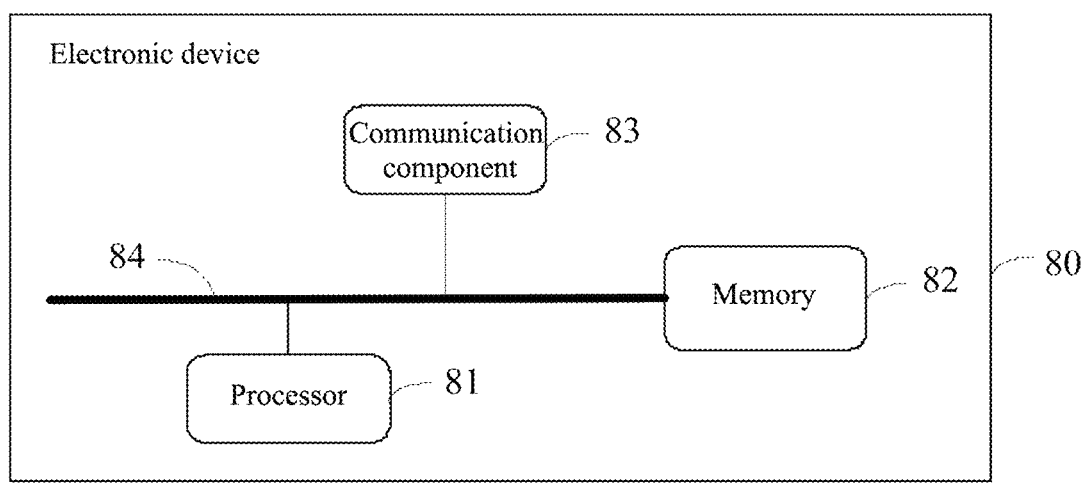
FIG. 8 is a schematic structural diagram of an electronic device according to an embodiment of the present disclosure.

FIG. 8 is a schematic structural diagram of an electronic device according to an embodiment of the present disclosure. As shown in FIG. 8, the electronic device 80 includes:

a processor 81 and a memory 82;

the memory 82 is configured to store computer executable instructions;

the processor 81 is configured to execute the computer executable instructions such that the electronic device 80 performs the steps performed by the AI camera or server in the information processing method as described above. The server includes a local server and a cloud server.

For a specific implementation process of the processor 81, reference may be made to the foregoing method embodiments, to which the implementation principles and technical effects are similar, and thus details are not described herein again.

Optionally, the electronic device 80 further includes a communication component 83. Among them, the processor 81, the memory 82, and the communication component 83 may be connected by a bus 84.

An embodiment of the present disclosure further provides a computer readable storage medium storing computer execution instructions for implementing the information processing method as described above when executed by a processor.

An embodiment of the present disclosure further provides an information processing system, which is applicable to an unmanned retail scenario, including: an AI camera and a server as described above.

Optionally, the server may include a local server and a cloud server. The local server is configured to perform the steps performed by the local server in the information processing method as described above; and the cloud server is used in the step of the local server executed in the information processing method as described above.

In the above embodiments, it should be understood that the disclosed device and method may be implemented in other manners. For example, the device embodiments described above are only illustrative. For example, the division of the modules is only a division of logical functions. In actual implementation, there may be another division manner. For example, multiple modules may be combined or integrated to another system, or some features can be ignored or not executed. In addition, the mutual coupling or direct coupling or communication connection shown or discussed may be an indirect coupling or communication connection through some interfaces, device or module, and may be electrical, mechanical or otherwise.

The modules described as separate components may or may not be physically separated, and a component shown as a module may or may not be a physical unit, that is, it may be located in one place, or may be distributed to multiple network units. Some or all of the modules may be selected according to actual needs to achieve the purpose of the solution of the embodiment.

In addition, each functional module in each embodiment of the present disclosure may be integrated into one processing unit, or each module may present physically separately, or two or more modules may be integrated into one unit. The unit formed by the above module can be implemented in the form of hardware or in the form of hardware plus software functional units.

The above-described integrated module implemented in the form of a software function module may be stored in a computer readable storage medium. The software function module is stored in a storage medium, and includes a plurality of instructions for causing a computer device (which may be a personal computer, a server, or a network device, etc.) or a processor to perform part of the steps in the embodiments of the present disclosure.

It should be understood that the foregoing processor may be a central processing unit (CPU), or may be a general-purpose processors, a digital signal processors (DSP), an application specific integrated circuit (ASIC). The general purpose processor may be a microprocessor or any conventional processor or the like. The steps of the method disclosed in connection with the invention may be directly embodied by the execution of the hardware processor or by a combination of hardware and software modules in the processor.

The memory may include high speed random access memory (RAM), and may also include non-volatile memory (NVM), such as at least one disk memory, and may also be a USB flash drive, a removable hard disk, a read only memory, a magnetic disk, or an optical disk and the like.

The bus may be an Industry Standard Architecture (ISA) bus, a Peripheral Component (PCI) bus, or an Extended Industry Standard Architecture (EISA) bus. The bus may be divided into an address bus, a data bus, a control bus, and the like. For ease of representation, the bus in the drawings of the present disclosure is not limited to only one bus or one type of bus.

The above storage medium may be implemented by any type of volatile or non-volatile storage device or a combination thereof, such as static random access memory (SRAM), electrically erasable programmable read only memory (EEPROM), erasable programmable read-only memory (EPROM), programmable read-only memory (PROM), read-only memory (ROM), magnetic memory, flash Memory, disk or compact disc. A storage medium may be any available medium that can be accessed by a general purpose or special purpose computer.

An exemplary storage medium is coupled to a processor to enable the processor to read information from, and write information to, the storage medium. Of course, the storage medium may also be an integral part of the processor. The processor and the storage medium may be located in an application specific integrated circuit (ASIC). Of course, the processor and the storage medium may also reside as a discrete component in a terminal or server.

Those of ordinary skilled in the art will appreciate that all or part of the steps to implement the various method embodiments described above may be accomplished by hardware associated with the program instructions. The aforementioned program may be stored in a computer readable storage medium. The program, when executed, performs the steps including the foregoing method embodiments; and the foregoing storage medium includes various medium that can store program codes, such as a ROM, a RAM, a magnetic disk, or a compact disk.

Last but not least, it should be noted that the above embodiments are merely illustrative of the technical solutions of the present disclosure, and are not intended to be limiting; although the present disclosure has been described in detail with reference to the foregoing embodiments, those skilled in the art will understand that the technical solutions described in the foregoing embodiments may be modified, or some or all of the technical features may be equivalently substituted; where the modifications or substitutions do not make the corresponding solution deviate from the scope of the technical solutions of the embodiments of the present disclosure.

What is claimed is:

1. An information processing method, which is applicable to an unmanned retail scenario, comprising:
   obtaining, by an artificial intelligence (AI) camera, real-time data in the unmanned retail scenario;
   performing, by the AI camera, a front-end processing on the real-time data based on a neural network model, wherein the front-end processing comprises any one or more of commodity identifying and human body monitoring; and
   transmitting, by the AI camera, a result of the front-end processing to a server, wherein the result of the front-end processing is used to trigger the server to perform face recognition and/or determine a flow direction of a commodity according to the result of the front-end processing;
   wherein the server comprises a local server and a cloud server, and the transmitting, by the AI camera, a result of the front-end processing to a server comprises:
   transmitting, by the AI camera, the result of the front-end processing to the local server, wherein the result of the front-end processing is used to trigger the local server to perform an edge processing according to the result of the front-end processing, and transmit a result of the edge processing to the cloud server, wherein the result of the edge processing is used to trigger the cloud server to perform the face recognition and/or determine the flow direction of the commodity according to the result of the edge processing, wherein the edge processing comprises a visual processing of a human body.

2. The information processing method according to claim 1, wherein the neural network model comprises a Single Shot MultiBox Detector-MobileNet (SSD-MobileNet) model and a convolutional neural network (CNN) model.

3. The information processing method according to claim 1, wherein the result of the edge processing is further used to trigger the cloud server to generate a bill according to the result of the edge processing and transmit the bill to a user equipment.

4. The information processing method according to claim 1, wherein the AI camera comprises a camera and an AI chip connected to the camera; wherein:
   the camera is configured to capture the real-time data in the unmanned retail scenario and transmit the real-time data to the AI chip; and
   the AI chip is configured to perform the front-end processing on the real-time data based on the neural network model, and transmit the result of the front-end processing to the server.

5. An electronic device, comprising a processor and a memory;
   the memory is configured to store computer executable instructions;
   the processor is configured to execute the computer executable instructions, so that the processor performs the information processing method according to claim 1 and/or an information processing method, which is applicable to an unmanned retail scenario, comprising:
   receiving, by a server, a result of a front-end processing, wherein the result of the front-end processing is a result of the front-end processing performed by an artificial intelligence (AI) camera on real-time data in the unmanned retail scenario based on a neural network model, wherein the front-end processing comprises any one or more of commodity identifying and human body monitoring; and
   performing face recognition and/or determining a flow direction of a commodity according to the result of the front-end processing.

6. A non-transitory computer readable storage medium, storing a computer execution instruction which, when executed by a processor to implement the following:
   the information processing method according to claim 1; and/or
   an information processing method, which is applicable to an unmanned retail scenario, comprising:
   receiving, by a server, a result of a front-end processing, wherein the result of the front-end processing is a result of the front-end processing performed by an artificial intelligence (AI) camera on real-time data in the unmanned retail scenario based on a neural network model, wherein the front-end processing comprises any one or more of commodity identifying and human body monitoring; and
   performing face recognition and/or determining a flow direction of a commodity according to the result of the front-end processing.

7. An information processing method, which is applicable to an unmanned retail scenario, comprising:
   receiving, by a server, a result of a front-end processing, wherein the result of the front-end processing is a result of the front-end processing performed by an artificial intelligence (AI) camera on real-time data in the unmanned retail scenario based on a neural network model, wherein the front-end processing comprises any one or more of commodity identifying and human body monitoring; and
   performing face recognition and/or determining a flow direction of a commodity according to the result of the front-end processing;
   wherein the server comprises a cloud server, and the performing of face recognition and/or determining a flow direction of a commodity according to the result of the front-end processing comprises:
   receiving, by the cloud server, a result of an edge processing, wherein the result of the edge processing is a result of the edge processing performed by a local server according to the result of the front-end processing, wherein the edge processing comprises a visual processing of a human body; and
   performing the face recognition and/or determining the flow direction of the commodity according to the result of the edge processing.

8. The information processing method according to claim 7, wherein the neural network model comprises a Single Shot MultiBox Detector-MobileNet (SSD-MobileNet) model and a convolutional neural network (CNN) model.

9. The information processing method according to claim 7, wherein the server comprises the local server; and the performing of face recognition and/or determining a flow direction of a commodity according to the result of the front-end processing further comprises:
   performing, by the local server, the edge processing according to the result of the front-end processing; and
   transmitting the result of the edge processing to the cloud server, wherein the result of the edge processing is used to trigger the cloud server to perform the face recognition and/or determine the flow direction of the commodity according to the result of the edge processing.

10. The information processing method according to claim 7, wherein after the receiving, by the cloud server, of a result of an edge processing, the method further comprises:
generating a bill according to the result of the edge processing; and
transmitting the bill to a user equipment.

11. An artificial intelligence (AI) camera, which is applicable to an unmanned retail scenario, comprising a processor and a memory, wherein
the memory has a computer program stored therein; and
the processor, when executing the computer program, is configured to:
obtain real-time data in the unmanned retail scenario;
perform a front-end processing on the real-time data obtained based on a neural network model, wherein the front-end processing comprises any one or more of commodity identifying and human body monitoring; and
transmit a result of the front-end processing obtained to a server, wherein the result of the front-end processing is used to trigger the server to perform face recognition and/or determine a flow direction of a commodity according to the result of the front-end processing;
wherein server comprises a local server and a cloud server, and the processor is further configured to:
transmit the result of the front-end processing to the local server, wherein the result of the front-end processing is used to trigger the local server to perform an edge processing according to the result of the front-end processing, and transmit a result of the edge processing to the cloud server, wherein the result of the edge processing is used to trigger the cloud server to perform the face recognition and/or determine the flow direction of the commodity according to the result of the edge processing, wherein the edge processing comprises a visual processing of a human body.

12. The AI camera according to claim 11, wherein the neural network model comprises a Single Shot MultiBox Detector-MobileNet (SSD-MobileNet) model and a convolutional neural network (CNN) model.

13. The AI camera according to claim 11, wherein the result of the edge processing is further used to trigger the cloud server to generate a bill according to the result of the edge processing and transmit the bill to a user equipment.

14. The AI camera according to claim 11, wherein the processor is further configured to:
capture the real-time data in the unmanned retail scenario and transmit the real-time data to the AI chip; and
perform the front-end processing on the real-time data based on the neural network model, and transmit the result of the front-end processing to the server.

15. An information processing system, which is applicable to an unmanned retail scenario, comprising:
an artificial intelligence (AI) camera, which is applicable to an unmanned retail scenario, comprising a processor and a memory, wherein
the memory has a computer program stored therein; and
the processor, when executing the computer program, is configured to:
obtain real-time data in the unmanned retail scenario;
perform a front-end processing on the real-time data obtained based on a neural network model, wherein the front-end processing comprises any one or more of commodity identifying and human body monitoring; and
transmit a result of the front-end processing obtained to a server, wherein the result of the front-end processing is used to trigger the server to perform face recognition and/or determine a flow direction of a commodity according to the result of the front-end processing; and
a server comprising the AI camera according to claim 11, wherein the neural network model comprises a Single Shot MultiBox Detector-MobileNet (SSD-MobileNet) model and a convolutional neural network (CNN) model.

16. The information processing system according to claim 15, wherein the server comprises a local server and a cloud server, wherein the local server is configured to execute an information processing method, wherein the server comprises a local server; and the performing of face recognition and/or determining a flow direction of a commodity according to the result of the front-end processing comprises:
performing, by the local server, an edge processing according to the result of the front-end processing, wherein the edge processing comprises a visual processing of a human body; and
transmitting a result of the edge processing to a cloud server, wherein the result of the edge processing is used to trigger the cloud server to perform the face recognition and/or determine the flow direction of the commodity according to the result of the edge processing; and the cloud server is configured to execute an information processing method, wherein the server comprises a cloud server, and the performing of face recognition and/or determining a flow direction of a commodity according to the result of the front-end processing comprises:
receiving, by the cloud server, a result of an edge processing, wherein the result of the edge processing is a result of the edge processing performed by a local server according to the result of the front-end processing, wherein the edge processing comprises a visual processing of a human body; and
performing the face recognition and/or determining the flow direction of the commodity according to the result of the edge processing.

* * * * *